Patented Nov. 23, 1943

2,334,711

UNITED STATES PATENT OFFICE 2,334,711

CYANINE DYESTUFF INTERMEDIATES

John David Kendall and John Raymond Majer, Ilford, England, assignors to Ilford Limited, Ilford, Essex, England, a company of Great Britain No Drawing. Application February 16, 1942, Serial No. 431,164. In Great Britain April 7, 1941

10 Claims. (Cl. 260—240)

This invention relates to the production of new organic compounds and particularly to the production of organic compounds which serve as intermediates in the production of dyes.

According to the present invention an alkyl or aralkyl quaternary salt of a heterocyclic nitrogen compound containing a reactive methyl or monosubstituted methyl group in the $\alpha$ or $\gamma$ position to the quaternary heterocyclic nitrogen atom is reacted, in the presence of a base and a solvent, with carbon disulphide.

The course of the reaction is illustrated by the following equation:

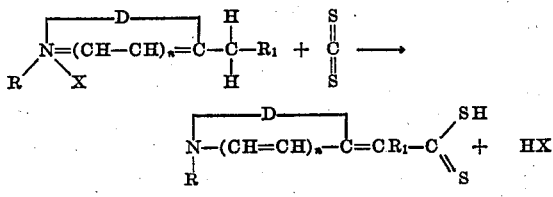

In this equation, R is an alkyl or aralkyl group (e. g. a methyl, ethyl, propyl or higher alkyl group, an allyl or similar unsubstituted group, or a benzyl group), $R_1$ is a hydrogen atom or an alkyl, aryl or aralkyl group, X is an acid residue, (e. g. chloride, bromide, iodide, sulphate, p-toluene sulphonate or perchlorate), D is the residue of a heterocyclic nitrogen compound and $n$ is nought or 1.

The dyestuff intermediates of this invention may be regarded as derivatives of dithio-acetic acid.

Any of the known types of heterocyclic quaternary ammonium compounds containing the specified reactive methyl group previously described for use in the manufacture of cyanine dyes may be employed in the process of the present invention. Examples are the substituted and unsubstituted thiazoles, oxazoles, selenazoles and their polycyclic homologues such as those of the benzene, naphthalene, acenaphthene and anthracene series; pyridine and its polycyclic homologues such as quinoline and $\alpha$ and $\beta$ naphthaquinolines; lepidines; indolenines; diazines; such as pyrimidines and quinazolines; diazoles (e. g. thio-$\beta\beta'$-diazole) oxazolines, thiazolines and selenazolines. The polycyclic compounds of these series may also be substituted in the carbocyclic rings with one or more groups such as alkyl, aryl, amino, hydroxy, alkoxy and methylene dioxy groups, or by halogen atoms.

The reaction may be effected by heating the reagents together but is preferably effected by allowing the reagents to stand together at room temperature. As indicated above a base and a solvent should be present in the reaction mixture. The base is preferably one that will not react with carbon disulphide, and organic tertiary bases, e. g. triethylamine and triethanolamine are particularly useful. Pyridine which serves as both base and solvent may also be used. In general, lower alcohols are satisfactory solvents and they may be used in conjunction with the organic base or with an inorganic base, e. g. an alcoholic solution of sodium acetate.

Where there is used a base which tends to react with carbon disulphide, only one molecular proportion should be used and this should be added to the quaternary salt of the heterocyclic nitrogen compound before the carbon disulphide is added.

The following examples illustrate the invention:

EXAMPLE I

The following general method is employed. Molecularly equivalent weights of a heterocyclic nitrogen base and of an alkyl-p-toluene sulphonate are fused together for about 2 to 3 hours at 120–150° C. The fused mass is then dissolved in the minimum quantity of ethyl alcohol required to effect solution on warming and one molecular equivalent of a base, e. g. triethylamine, is added. The solution is cooled and a slight excess over one molecular equivalent of carbon disulphide is added. The solution is then warmed to about 40° C. and then allowed to stand overnight. The desired dithio-acetic acid derivative separates out on standing.

The following are specific dithio-acetic acid derivatives which may be prepared by this general process:

(N-methyl-dihydrobenzthiazolylidene-1)-dithio-acetic acid. Melting point 236° C.
(N-ethyl-dihydrobenzthiazolylidene - 1) - dithio-acetic acid. Melting point 222° C.
(N-ethyl-dihydrobenzselenazolylidene-1)-dithio-acetic acid. Melting point 242° C.
(N-methyl - tetrahydrothiazolylidene-2)-dithio-acetic acid. Melting point 209° C.
(N-methyl-1:2-dihydroquinolylidene-2)-dithio-acetic acid. Melting point 168° C.
(N-methyl - 3:3 - dimethyl-dihydroindolylidene-2)-dithio-acetic acid. Melting point 192° C.
$\alpha$-(N - methyl - dihydrobenzthiazolylidene-1)-dithio-propionic acid. Melting point 232° C.
(N-methyl-dihydro quinolylidene-4)-dithio acetic acid. Melting point 182° C.

Example II

The following is an example of the process where the reagents are heated together:

(N-methyl-dihydrobenzthiazolylidene-1)-dithio-acetic acid 1.49 gms. of 1-methyl benzthiazole and 1.86 gms. of methyl-p-toluene sulphonate were fused together for two hours at 120–130° C. To the cooled product, 20 ccs. of pyridine and 3 ccs. of carbon disulphide were added and the resulting solution was boiled under reflux for 48 hours. The solution was then cooled and the desired product crystallised out.

The dyestuff intermediates produced according to the present invention may be converted to other dyestuff derivatives by treatment with alkyl or aralkyl salts and thence converted to dyestuffs as described in co-pending application No. 431,165 filed on even date herewith, corresponding to British application No. 4,602/41.

What we claim is:

1. Process for the manufacture of dyestuff intermediates which comprises condensing with carbon disulphide, in the presence of a base and a solvent, a compound selected from the group consisting of alkyl and aralkyl quaternary salts of heterocyclic nitrogen compounds containing in one of the α and γ positions to the quaternary nitrogen atom a reactive group selected from the class consisting of reactive methyl and mono-substituted methyl groups.

2. Process for the manufacture of dyestuff intermediates which comprises condensing with carbon disulphide, in the presence of an organic tertiary base and a solvent, a compound selected from the group consisting of alkyl and aralkyl quaternary salts of heterocyclic nitrogen compounds containing in one of the alpha and gamma positions to the quaternary nitrogen atom a reactive group selected from the class consisting of reactive methyl and mono-substituted methyl groups.

3. Process for the manufacture of dyestuff intermediates which comprises condensing with carbon disulphide, in the presence of pyridine which serves as both base and solvent, a compound selected from the group consisting of alkyl and aralkyl quaternary salts of heterocyclic nitrogen compounds containing in one of the alpha and gamma positions to the quaternary nitrogen atom a reactive group selected from the class consisting of reactive methyl and mono-substituted methyl groups.

4. Process for the manufacture of dyestuff intermediates which comprises condensing with carbon disulphide, in the presence of a base and a solvent, a compound selected from the group consisting of alkyl and aralkyl in one of the alpha and gamma positions to the quaternary nitrogen atom a reactive group selected from the class consisting of reactive methyl and mono-substituted methyl groups, by allowing the reactants to stand together at room temperature.

5. Dyestuff intermediates of the general formula:

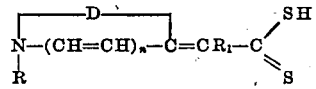

where R is selected from the class consisting of alkyl and aralkyl groups, $R_1$ is selected from the class consisting of hydrogen atoms and alkyl, aryl and aralkyl groups, D represents the atoms necessary to complete a heterocyclic nitrogen compound and $n$ is selected from the class consisting of nought and 1.

6. Dyestuff intermediates of the general formula:

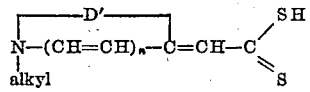

wherein D′ constitutes the atoms necessary to complete a thiazole nucleus and $n$ is selected from the group consisting of nought and 1.

7. The chemical compound: (N-methyl-dihydrobenzthiazolylidene-1)-dithio-acetic acid.

8. The chemical compound: (N-ethyl-dihydrobenzthiazolylidene-1)-dithio-acetic acid.

9. Dyestuff intermediates of the general formula:

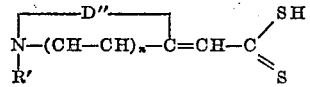

wherein R′ is an alkyl radical, D″ represents the atoms necessary to complete a quinoline nucleus and $n$ is selected from the group consisting of nought and 1.

10. The chemical compound: (N-methyl-1,2-dihydroquinolylidene-2-)-dithio-acetic acid.

JOHN DAVID KENDALL.
JOHN RAYMOND MAJER.